(12) United States Patent
Heim et al.

(10) Patent No.: US 6,419,525 B1
(45) Date of Patent: Jul. 16, 2002

(54) CONTACT BLOCK FOR A CHIP CARD READER

(75) Inventors: Michael Heim, Heilbronn; Manfred Reichardt, Weinsberg, both of (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/626,161

(22) Filed: Jul. 26, 2000

(30) Foreign Application Priority Data

Jul. 27, 1999 (DE) .......................................... 199 35 188

(51) Int. Cl.[7] .............................................. H01R 24/00
(52) U.S. Cl. ........................................ 439/630; 235/441
(58) Field of Search ................................ 439/885, 630, 439/260, 736; 235/441

(56) References Cited

U.S. PATENT DOCUMENTS

| | | | | |
|---|---|---|---|---|
| 4,089,575 A | * | 5/1978 | Grabbe | 439/71 |
| 5,013,255 A | | 5/1991 | Juret et al. | 439/260 |
| 5,145,383 A | * | 9/1992 | Bowen et al. | 439/885 |
| 5,169,345 A | | 12/1992 | Pernet | 439/630 |
| 5,269,707 A | * | 12/1993 | Reichardt et al. | 439/630 |
| 5,586,890 A | * | 12/1996 | Braun | 439/630 |
| 6,006,987 A | | 12/1999 | Hoolhorst | 235/375 |
| 6,139,377 A | * | 10/2000 | Chen | 439/885 |
| 6,165,021 A | * | 12/2000 | Bourne | 439/630 |

* cited by examiner

*Primary Examiner*—Neil Abrams
*Assistant Examiner*—Javaid Nasri
(74) *Attorney, Agent, or Firm*—Blank Rome LLP

(57) ABSTRACT

In accordance with the invention, a contact block having a contact carrier of a chip card reader and contact elements is provided. The contact elements each have contact sections and terminal sections as well as intermediate sections extending between the contact sections and the terminal sections. The intermediate sections are surrounded by the contact carrier and are formed as stiffeners for the contact carrier.

28 Claims, 3 Drawing Sheets

CONTACT BLOCK FOR A CHIP CARD READER

TECHNICAL FIELD

The present invention relates to a contact block of a chip card reader having a contact carrier and contact elements arranged therein, the contact elements each comprising a contact section, an intermediate or joining section which is enclosed by said contact carrier and a terminal section.

BACKGROUND ART

A contact block for a chip card reader of the above type is for example known from U.S. Pat. No. 5,013,255. The contact block is formed by cutting contact elements from a strip of sheet metal such that they have a free end (contact end) and an opposite end (terminal end) which is connected to a pilot strip in order to hold the contact elements in the stamped arrangement. An intermediate section extends between the opposite ends of the contact elements. In a further manufacturing step, the intermediate or joining sections of the contact elements are enclosed by material for forming a contact carrier, using an injection molding technique. Finally, the pilot strips are removed from the contact elements. The contact block comprises two sets of contact elements which, project into cut outs in said contact carrier from opposite sides and the contacts elements are guided out of said contact carrier at the opposite sides of the contact carrier.

The terminal ends of the contact elements are formed as soldering contacts. In view of the detrimental effects to the environment related to the soldering of such contacts, there is a tendency to form the terminal ends into pressure contacts, i.e. contacts which are simply pressed against respective contact elements without the need of soldering or other forms of attachment. The use of pressure contacts, however, increases the forces acting on the contact carrier in view of the inherent spring force of the pressure contacts. These forces, however, are capable of damaging conventional contact blocks in view of their low stiffness.

It is therefore an object of the present invention to provide a simple and inexpensive contact block for a chip card reader which comprises good durability and stiffness.

DISCLOSURE OF THE INVENTION

In one aspect of the invention, a contact block for a chip card reader having a contact carrier and contact elements arranged therein is provided. The contact elements each have a contacting section, an intermediate or joining section, which is enclosed by said contact carrier, and a terminal section. The intermediate sections are formed as a stiffener or reinforcement for the contact carrier, at least one of the intermediate sections has at least one bend (i.e. a portion of the intermediate sections, where a change of orientation occurs) within the plane of the contact carrier and is bent by at least 90°. The at least one intermediate section which is bent by at least 90° within the plane of the contact carrier provides longitudinal as well as transverse stiffening for the contact carrier, thus increasing the overall stiffness thereof. The at least 90° may be achieved by more than one bend.

Using the intermediate section of the contact elements as stiffeners, the stiffness of the contact carrier may be increased in a simple and cost effective manner, without increasing the thickness of the contact bock and without the use of separate elements. At least one of the contact elements preferably comprises a broadening in the intermediate section compared to the contacting section. Due to the broadening, a larger area of the contact carrier comprises a core formed by the contact elements, thus increasing the stiffness.

In one aspect of the invention, a contact block for a chip card reader having a contact carrier and contact elements arranged therein is provided, wherein the contact elements each have a contacting section, an intermediate or joining section, which is enclosed by said contact carrier, and a terminal section, the intermediate sections being formed as a stiffener for the contact carrier, the contacting sections of the contact elements extend from different directions into a contact area formed in the contact carrier and all the terminal sections extend from a common side of the contact carrier. Having the terminal sections of the contact elements extending form a common side of the contact carrier enables easy connection of the contact block to a housing for receiving said contact block.

According to a preferred embodiment of the invention at least one of the intermediate sections comprises at least one bend within the plane of the contact carrier, in order to achieve increased stiffening effects in different directions of the contact carrier. Preferably, at least one of said intermediate sections is bent by at least 90° within the plane of the contact carrier in order to provide longitudinal as well as transverse stiffening of the contact carrier. Preferably, at least one of the intermediate sections comprise more than one bend within the plane of the contact carrier in order to achieve a good stiffening effect.

In a further embodiment of the invention, at least one of the contact elements has a stiffening arm providing a stiffening effect outside of the connecting path of the intermediate sections. The stiffening arm extends into areas of the contact carrier in which no intermediate sections of the contact elements are present in order to provide an additional stiffening effect in these areas of the contact carrier.

Preferably, at least one of the intermediate sections comprises a cusp in order to achieve a higher stiffening effect.

The contact carrier preferably has a common opening into which the contact sections of the contact elements extend. The opening has a suitable form and size which enables the contact elements to act as springs. The contact sections of the contact elements preferably extend from opposite sides into the opening, and are interleaved, thus enabling in a simple manner a two-row arrangement of contact cusps with the contact sections each providing a sufficient spring arm.

In a preferred embodiment of the invention, the terminal sections of the contact elements extend from a longitudinal side of the contact carrier, thus decreasing the mounting depths of the contact block. Further, when the contact elements extend from a longitudinal side of the contact carrier, the intermediate sections extend at least partially transverse to the contact carrier, thereby providing good transverse stiffening of the contact carrier. In an alternative embodiment of the invention, the terminal sections of the contact elements extend from a transverse side of the contact carrier which is advantageous for use in a housing having a small width.

The contact elements are preferably stamped portions which are preferably stamped from a sheet metal for easy and inexpensive manufacture thereof. The contact elements are preferably arranged in a stamping grid, i.e. they are stamped directly in a single stamping process into the arrangement of their later use, thus avoiding complicated arrangement of the elements in a later step. Preferably, at least one of the contact elements is connected to a pilot strip of the stamped sheet metal in order to permit easy transport of the contact block via the pilot strip. Separate packing for the contact blocks is not necessary, since they may be held by the pilot strip and may be delivered to the customers with said pilot strip.

In accordance with a preferred embodiment of the invention, the contact carrier comprises a raised corner portion for the chip card in order to provide good guidance and reception of said chip card.

BRIEF DESCRIPTION OF THE DRAWINGS

The present invention is described in more detail herein below with reference to the drawings.

BEST MODE FOR CARRYING OUT THE INVENTION

Figure 1:
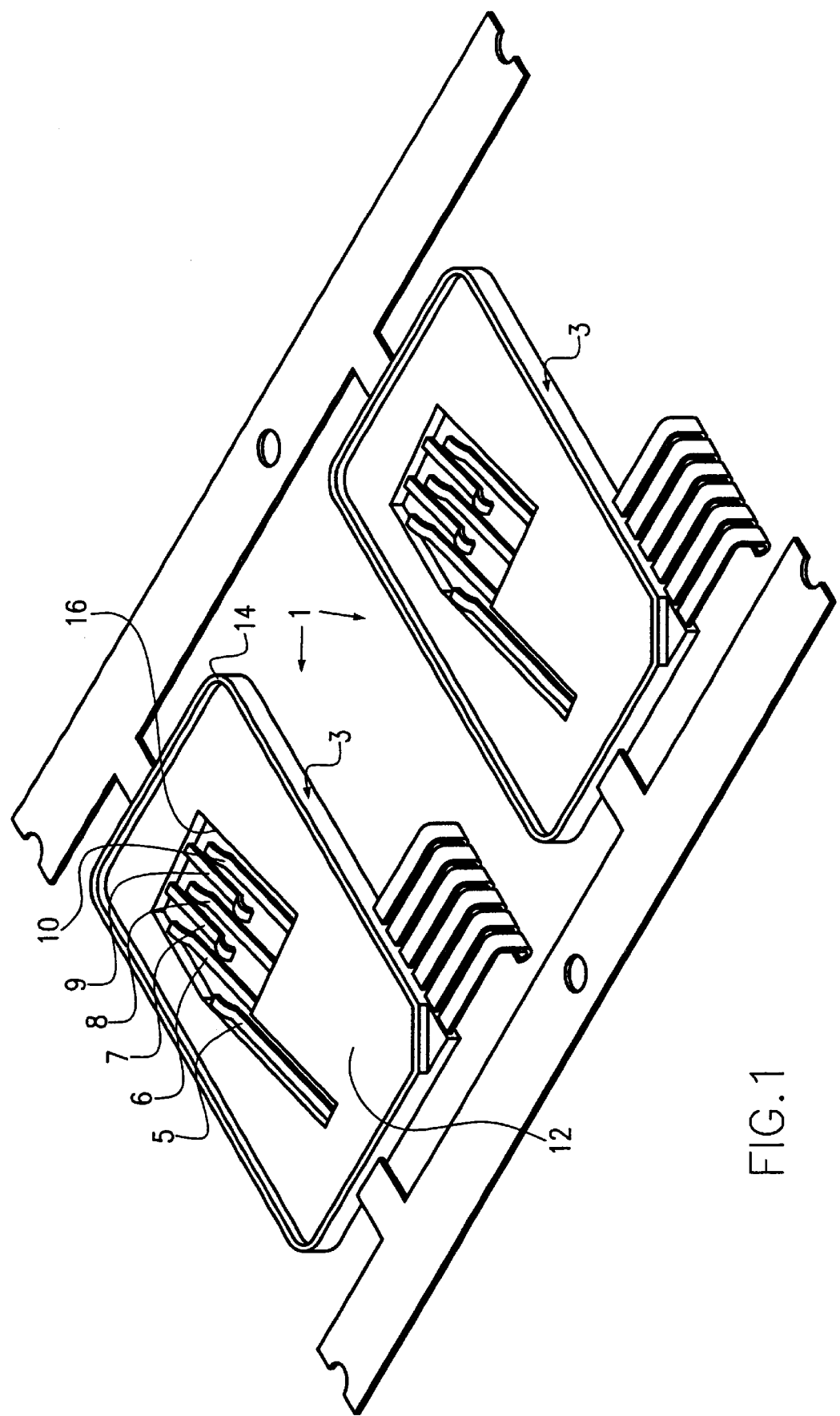
FIG. 1 shows a perspective top view of two contact blocks in accordance with the present invention.

FIG. 1 shows two contact blocks 1 each having a contact carrier 3 carrying contact elements 5, 6, 7, 8, 9, and 10.

Figure 2:
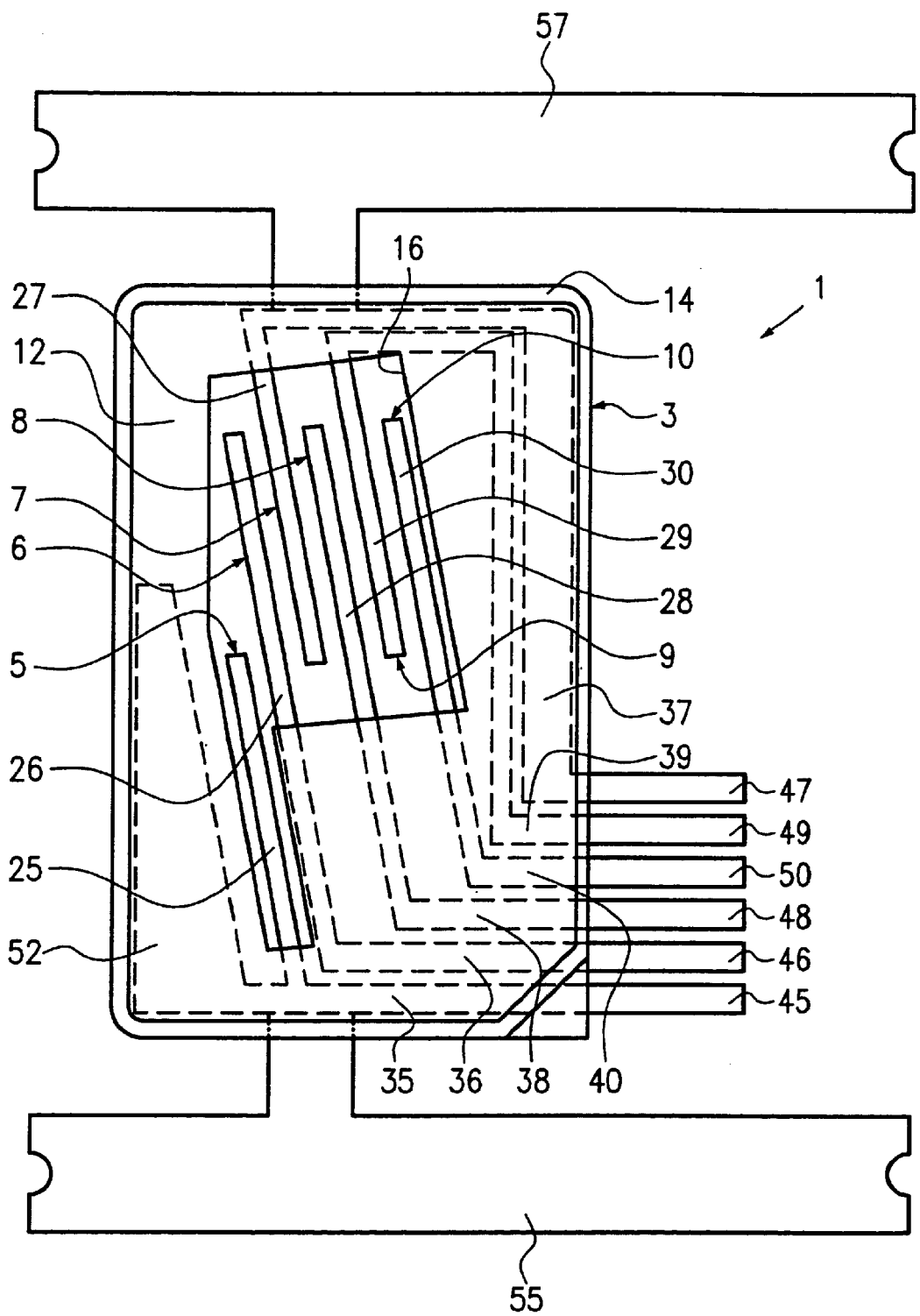
FIG. 2 shows a schematic top plan view of a contact block in accordance with FIG. 1, in which hidden portions are shown with dashed lines.

The contact carriers 3 each have a substantially rectangular form having rounded corner portions as is best shown in FIG. 2. The contact carrier 3 has a base plate 12 which encloses parts of the contact elements 5–10, as will be described in more detail herein below. The contact carrier 3 comprises a raised rim portion 14 which is raised above an upper surface of the base plate 12. The rim portion 14 has a shape fitting a SIM-card thereby forming a receptacle for receiving the SIM-card. The base plate 12 has an opening 16 into which the contact elements 5–10 extend. The opening 16 has substantially the shape of a parallelogram (main shape) and additionally comprises a leg section extending from said main shape, the function of said leg section will be described in more detail herein below.

The contact elements 5, 6, 7, 8, 9, 10 each comprise a contact section 25, 26, 27, 28, 29, 30 which extends into the opening 16. At the free ends of the contact sections 25–30 contact cusps are provided. The contact sections 25, 26, 28, and 30 extend from a first (transverse) side into the opening 16, and the contact sections 27 and 29 extend from the opposite (transverse) side into the opening 16. In the shown embodiment the contact sections 25–30 extend in a 4:2 relationship into the opening 16. The contact sections 25–30 are arranged such that the contact cusps of the contact sections 25, 27 and 29 are arranged on a first line, while the contact cusps of the contact sections 26, 28 and 30 are arranged on a second line. The contact sections 27 and 29 are interleaved with the contact sections 26, 28 and 30. Thus, the contact sections 25–30 form a sufficient long spring arm in the opening 16. In order to provide a sufficient spring arm for the contact section 25, a main portion thereof is arranged in the leg section of the opening 16. Arranging the main portion of the contact section 25 in the leg section of the opening 16 facilitates its contact cusp to be on one line with the contact cusps of the contact sections 27 and 29, which extend from an opposite side into the opening 16. Alternatively, contact sections 25, 27 and 29 could extend from a common side into the opening 16. Even though only one opening 16 is shown in the drawings, alternatively, several openings for receiving the contact sections of the contact elements may be provided.

Adjacent to the contact sections 25, 26, 27, 28, 29, and 30 the contact elements 5, 6, 7, 8, 9, and 10 comprise intermediate or connecting sections 35, 36, 37, 38, 39, and 40. The intermediate sections 35–40 are each surrounded by said base plate 12. The intermediate sections 35–40 have ends spaced from said contact sections 25–30 which extend from the base plate 12 and are adjacent to corresponding terminal sections 45, 46, 47, 48, 49, and 50 of the contact elements.

The terminal sections 45, 46, 47, 48, 49, and 50 are arranged parallel to each other and they extend at right angles from a longitudinal side of the contact carrier 3, as is best seen in the top view of FIG. 2. The terminal sections 45–50 are grouped together in one section of the longitudinal side of the contact carrier 3. In order to enable the terminal sections 45–50 to extend from the longitudinal side, the intermediate sections 35, 36, 38, and 40 each comprise one bend, i.e. a change of orientation. Thus, the intermediate sections contact or join the contact sections 25, 26, 28, and 30 extending substantially in a longitudinal direction with the corresponding terminal sections 45, 46, 48, and 50 extending substantially in a transverse direction of the contact carrier 3. The intermediate sections 37 and 39 each comprise three bends, in order to join the contact sections 27 and 29 with the respective terminal sections 47 and 49, as is shown in the top view of FIG. 2. The intermediate section 37 comprises a portion extending in a longitudinal direction of the contact carrier 3 which is broader than the contact section 27, thereby providing increased stiffness. Intermediate section 35 additionally comprises a stiffening arm 52 which extends into an area which lies outside of the connecting path between the contact sections 25–30 and the terminal sections 45–50. The stiffening arm 52 is also surrounded by plastic material of the base plate 12 and extends into a non-connecting area thereof, i.e. an area lying outside of a connecting area in which the intermediate sections 35–40 extend. Alternatively, (but not shown) a stiffening arm could also extend from the intermediate section 37 into said non-connecting area of the base plate.

The intermediate sections 35 and 37 are connected to respective pilot strips 55 and 57.

In the following, the manufacture of the contact block 1 according to the present invention will be described. First, a sheet metal is guided by the pilot strips 55, 57 into a stamping unit (not shown). In the stamping unit, the shape of the contact elements 5, 6, 7, 8, 9, and 10 is stamped out of said sheet metal in a single step. In the area of the respective contact sections and/or in the area of the terminal sections connecting webs (not shown) are left between the contact elements. The connecting webs are advantageous in holding the stamped contact elements in their relative position. After the stamping step of the contact elements, the contact elements 5 and 7 are still directly connected to the pilot strips 55, 57, respectively, while the remaining contact elements are also indirectly connected to the pilot strip via the above mentioned webs and contact elements 5 and 7. Thereafter, the stamped contact elements are transported as a unit or a stamping grid into an injection molding unit. In the injection molding unit the contact carrier 3 is formed by a suitable injection molding technique, wherein the base plate 12 surrounds or encloses the respective intermediate sections 35, 36, 37, 38, 39, and 40 of the contact elements 5, 6, 7, 8, 9, and 10. The thus formed contact block 1 is moved to a further process unit by the pilot strips 55, 57 which now carry the complete contact block 1. In the further processing unit, the webs extending between the contact sections and/or the terminal sections are removed, and the free ends of the contact sections are deformed for forming contact cusps. The free ends of the terminal sections 45, 46, 47, 48, 49, and 50 are deformed into the position shown in FIG. 1, thus forming pressure contacts 65, 66, 67, 68, 69, and 70. The bending of the free ends of the contact sections 25–30 as well as the bending of the free ends of the terminal sections 45–50 could also occur before forming the contact carrier, for example directly during the initial stamping process or in a separate process.

The contact blocks 1 thus formed are still connected to the pilot strip which is used as a carrier strip. The contact blocks 1 can be delivered to customers in this form. At the customer the contact blocks 1 are separated from said pilot strips 55, 57 in a separating dispenser and are directly processed, e.g. assembled into the housing of a chip card reader. Additional packing of the contact blocks 1, as for example a tape-and-reel-packing is not necessary.

The intermediate sections 35–40 are provided in a main portion of the base plate 12 and act as a stiffener of the base plate 12. Thereby the thickness of the base plate 12 is reduced compared with prior art contact blocks, without loosing the required stiffness, since the intermediate sections provide the required stiffness. For increasing the stiffness, the intermediate sections can have corrugations, even though this is not shown.

Since the contact elements 5–10 are placed in the injection molding unit in their stamped condition, i.e. in the form of a stamping grid, a complicated placement of single contact elements in the injection molding unit is not necessary.

It is noted that in the embodiment of FIGS. 1 and 2 (and also FIG. 3) the contact sections and parts of some of the intermediate sections 35–40 are inclined with respect to the longitudinal axis of a SIM-card inserted into the contact block 1.

Figure 3:
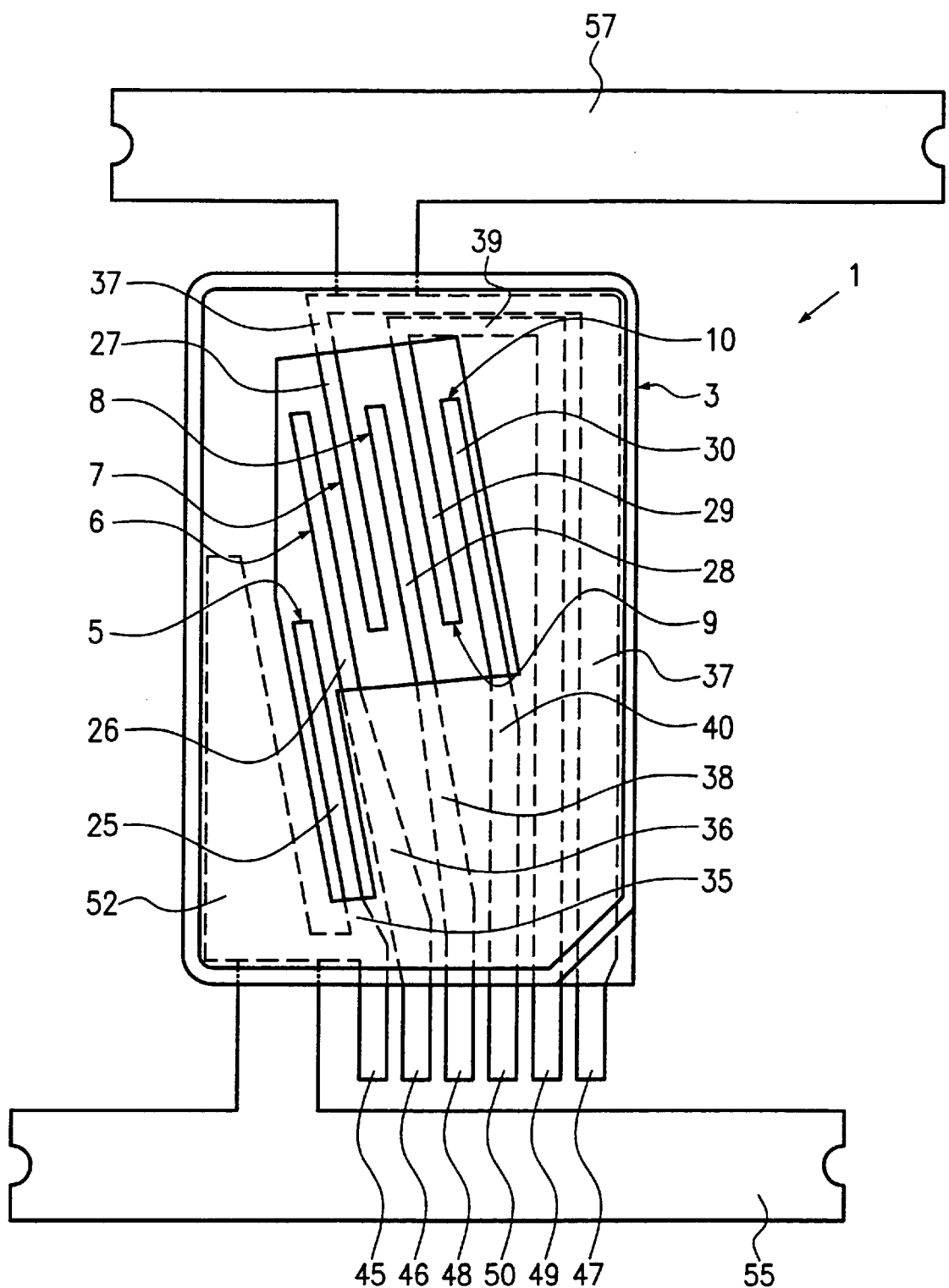
FIG. 3 shows a schematic top plan view of a contact block in accordance with an alternative embodiment of the present invention, in which hidden portions are shown with dashed lines.

FIG. 3 shows a further embodiment of a contact block in accordance with the present invention. In FIG. 3 the same reference signs are used as in FIGS. 1 and 2 for identical or similar components.

FIG. 3 shows a contact block 1 having a contact carrier 3 comprising the same shape as the contact carrier 3 according to the first embodiment. The contact block 1 also comprises contact elements 5, 6, 7, 8, 9, and 10 having respective contact sections 25, 26, 27, 28, 29, and 30, intermediate sections 35, 36, 37, 38, 39, and 40 and terminal sections 45, 46, 47, 48, 49, and 50. In contrast to the first embodiment, the terminal sections 45, 46, 47, 48, 49, and 50 extend from the small side of the contact carrier 3. Further, the intermediate sections 35, 36, 37, 38, 39, and 40 have an increased width compared to the respective contact sections, thus providing an increased stiffening effect for the base plate 12 of the contact carrier 3. Intermediate section 35 is connected to a stiffening arm 52 which extends into a non-joining area of the contact carrier 3. The connecting sections 37 and 39 of contact elements 7 and 9 again comprises a number of bends, in order to provide longitudinal as well as transverse stiffening of the base plate.

Although the invention has been described with respect to preferred embodiments, the invention is not limited to the specific embodiments. In particular, other shapes of the contact carrier and the contact elements are possible. Further, any number of contact elements may be used, depending on the specific application for which the contact block is to be used. It is essential for the invention that the enclosed intermediate sections of the respective contact elements are formed as stiffening elements due to their shape. This may be achieved for example by providing bends in these sections for providing longitudinal and transverse stiffening or by broadening the intermediate sections with respect to the contact sections.

What is claimed is:

1. A contact block for a chip card reader comprising
a contact carrier defining a plane and
contact elements arranged therein,
said contact elements each comprising a contact section, for engaging a chip card contact an intermediate section surrounded by said contact carrier, and a terminal section,
said intermediate sections being formed as a stiffener for the contact carrier and at least one of the intermediate sections comprising at least one bend, in the intermediate section, totaling at least 90° and within the plane of the contact carrier.

2. The contact block of claim 1, wherein at least one of said contact elements comprises a broadening in the intermediate section with respect to the contact sections.

3. The contact block of claim 1, wherein at least one of the intermediate sections comprises more than one bend within the plane of the contact carrier.

4. The contact block of claim 1, wherein at least one of said contact elements comprises a stiffening arm.

5. The contact block of claim 1, wherein said contact carrier comprises an opening into which the contact sections of said contact elements extend.

6. The contact block of claim 5, wherein the contact sections of said contact elements extend from said opening from opposite sides thereof.

7. The contact block of claim 1, wherein the terminal sections of said contact elements extend from a common side of said contact carrier.

8. The contact block of claim 7, wherein the terminal sections of said contact elements extend from a longitudinal side of said contact carrier.

9. The contact block of claim 7, wherein the terminal sections of said contact elements extend from a transverse side of said contact carrier.

10. The contact block of claim 1, wherein the contact elements are stamped portions.

11. The contact block of claim 10, wherein the contact elements are stamped from sheet metal.

12. The contact block claim 10, wherein the contact elements are arranged in a stamping grid.

13. The contact block of claim 1, wherein at least one of said contact elements is connected to a pilot strip.

14. The contact block of claim 1, wherein the contact carrier comprises a raised guide rim.

15. A contact block for a chip card reader comprising
a contact carrier defining a plane and including at least one opening and
contact elements, said contact elements each comprising a contact section for engaging a chip card contact extending into said opening, an intermediate section surrounded by said contact carrier, and a terminal section extending away from said contact carrier,
wherein said intermediate sections are formed as stiffeners for the contact carrier, and
at least some of the contact sections extend into said opening from a different direction than another of the contact sections and all of the terminal sections extend from a common side of said contact carrier.

16. The contact block of claim 15, characterized in that at least one of the intermediate sections comprises at least one bend in the intermediate section, the bend being at least 90° and within the plane of the contact carrier.

17. The contact block of claim 16, wherein at least one of the intermediate sections comprises more than one bend within the plane of the contact carrier.

18. The contact block of claim 15, wherein at least one of said contact elements comprises a broadening in the intermediate section with respect to the contact sections.

19. The contact block of claim 15, wherein at least one of said contact elements comprises a stiffening arm.

20. The contact block of claim 15, wherein the terminal sections of said contact elements extend from a longitudinal side of said contact carrier.

21. The contact block of claim 15, wherein the terminal sections of said contact elements extend from a transverse side of said contact carrier.

22. The contact block of claim 15, wherein the contact elements are stamped portions.

23. The contact block of claim 22, wherein the contact elements are stamped from sheet metal.

24. The contact block of claim 22, wherein the contact elements are arranged in a stamping grid.

25. The contact block of claim 15, wherein at least one of said contact elements is connected to a pilot strip.

26. The contact block of claim 15, wherein the contact carrier comprises a raised guide rim.

27. A contact block for a chip card reader comprising
a contact carrier defining a plane and
contact elements arranged therein,
   said contact elements each comprising a contact section, for engaging a chip card contact an intermediate section surrounded by said contact carrier, and a terminal section,
   said intermediate sections being formed as a stiffener for the contact carrier and at least one of the intermediate sections comprising at least one bend, in the intermediate section, totaling at least 90° and within the plane of the contact carrier;
   wherein the terminal sections of said contact elements extend from a longitudinal side of said contact carrier.

28. The contact block of claim 27, wherein at least one of the contact elements comprises a stiffening arm extending therefrom, the stiffening arm being entirely embedded in the contact block.

* * * * *

UNITED STATES PATENT AND TRADEMARK OFFICE
CERTIFICATE OF CORRECTION

PATENT NO.   : 6,419,525 B1
DATED        : July 16, 2002
INVENTOR(S)  : Michael Heim and Manfred Reichardt It is certified that error appears in the above-identified patent and that said Letters Patent is hereby corrected as shown below:

Column 1,
Line 65, change "bock" to -- block --.

Column 5,
Line 24, change "loosing" to -- losing --.

Column 6,
Line 46, after "block" insert -- of --.

Signed and Sealed this

Twenty-first Day of February, 2006

JON W. DUDAS
*Director of the United States Patent and Trademark Office*